(12) United States Patent
Rodriguez Outon

(10) Patent No.: US 11,298,864 B2
(45) Date of Patent: Apr. 12, 2022

(54) EXTRUSION DEVICE FOR THE PROCESSING OF PLASTICS, WHICH CAN BE COUPLED TO SYSTEMS FOR SUPPLYING THERMOSETTING AND THERMOPLASTIC POLYMERS

(71) Applicant: Pablo Rodriguez Outon, Barcelona (ES)

(72) Inventor: Pablo Rodriguez Outon, Barcelona (ES)

(*) Notice: Subject to any disclaimer, the term of this patent is extended or adjusted under 35 U.S.C. 154(b) by 2 days.

(21) Appl. No.: 16/500,984

(22) PCT Filed: Apr. 5, 2018

(86) PCT No.: PCT/ES2018/070298
§ 371 (c)(1),
(2) Date: Oct. 4, 2019

(87) PCT Pub. No.: WO2018/185357
PCT Pub. Date: Oct. 11, 2018

(65) Prior Publication Data
US 2020/0031038 A1 Jan. 30, 2020

(30) Foreign Application Priority Data

Apr. 5, 2017 (ES) .............................. ES201730425U
Oct. 4, 2017 (ES) ............................. ES201731161U

(51) Int. Cl.
*B29C 48/78* (2019.01)
*B29C 48/48* (2019.01)
(Continued)

(52) U.S. Cl.
CPC ........ *B29C 48/29* (2019.02); *B29C 48/25686* (2019.02); *B29C 48/286* (2019.02);
(Continued)

(58) Field of Classification Search
CPC ......... B29C 48/06; B29C 48/09; B29C 48/12; B29C 48/25686; B29C 48/286;
(Continued)

(56) References Cited

U.S. PATENT DOCUMENTS 1,370,800 A * 3/1921 Egerton ................ B29C 48/475
264/209.1
2,587,930 A * 3/1952 Uschmann .............. B29C 48/07
425/174.8 R (Continued)

FOREIGN PATENT DOCUMENTS

EP 0494222 B1 6/1995
KR 20120050757 A 5/2012

OTHER PUBLICATIONS

English abstract of KR20120050757, May 21, 2012.
International Search Report dated Sep. 20, 2018 (3 pages).

*Primary Examiner* — Xiao S Zhao
*Assistant Examiner* — Joseph S Leyson
(74) *Attorney, Agent, or Firm* — . Blue Filament Law PLLC

(57) ABSTRACT

A group of hollow modules through which the material to be extruded flows, is provided that includes at least: a rectangular heating-shaping module, in which the material undergoes a temperature increase and takes on the desired shape; and a tubular cooling-solidification module, in which the material changes from liquid to solid. A heating-reaction module is provided upstream of the heating-shaping module. The heating-reaction module includes an interchangeable hollow tube with an external heating system. The heating-shaping module includes detachable parts and includes another external heating system based on the auto-acceleration of the curing reaction and of the heat supply from said external heating system. The tubular portion between the heating-reaction module and the heating-shaping module (Continued)

includes a shaping coupling equipped with a through-hole. The extrusion module includes a circuit through which the polymer flows into at least two push compartments.

14 Claims, 7 Drawing Sheets

(51) Int. Cl.
    *B29C 48/25*     (2019.01)
    *B29C 48/86*     (2019.01)
    *B29C 48/285*     (2019.01)
    *B29C 48/30*     (2019.01)
    *B29C 48/29*     (2019.01)
    *B29C 48/91*     (2019.01)
    *B29C 48/92*     (2019.01)
    *B29K 101/10*     (2006.01)
    *B29C 48/06*     (2019.01)
    *B29C 48/09*     (2019.01)
    *B29C 48/12*     (2019.01)

(52) U.S. Cl.
CPC .............. *B29C 48/30* (2019.02); *B29C 48/48* (2019.02); *B29C 48/78* (2019.02); *B29C 48/873* (2019.02); *B29C 48/91* (2019.02); *B29C 48/92* (2019.02); *B29C 48/06* (2019.02); *B29C 48/09* (2019.02); *B29C 48/12* (2019.02); *B29C 2948/92704* (2019.02); *B29C 2948/92714* (2019.02); *B29C 2948/92904* (2019.02); *B29K 2101/10* (2013.01)

(58) Field of Classification Search
CPC ......... B29C 48/29; B29C 48/30; B29C 48/48; B29C 48/78; B29C 48/873; B29C 48/92; B29C 2948/92704; B29C 2948/92714; B29C 2948/92904

See application file for complete search history.

(56) References Cited

U.S. PATENT DOCUMENTS

| | | | |
|---|---|---|---|
| 2,770,841 A | | 11/1956 | Cooke |
| 3,154,618 A | | 10/1964 | Baer |
| 3,158,901 A | * | 12/1964 | Westover ................ B29C 48/49 425/379.1 |
| 3,461,490 A | | 8/1969 | Cottingham |
| 3,483,597 A | | 12/1969 | Windeler |
| 3,507,939 A | * | 4/1970 | Williams ................ B29C 48/12 264/40.6 |
| 3,887,319 A | * | 6/1975 | Cottingham .......... B29C 48/475 425/379.1 |
| 4,145,175 A | | 3/1979 | Groff |
| 4,240,997 A | | 12/1980 | Jex |
| 4,913,863 A | * | 4/1990 | Burrafato ................ B29C 48/06 264/40.6 |

\* cited by examiner

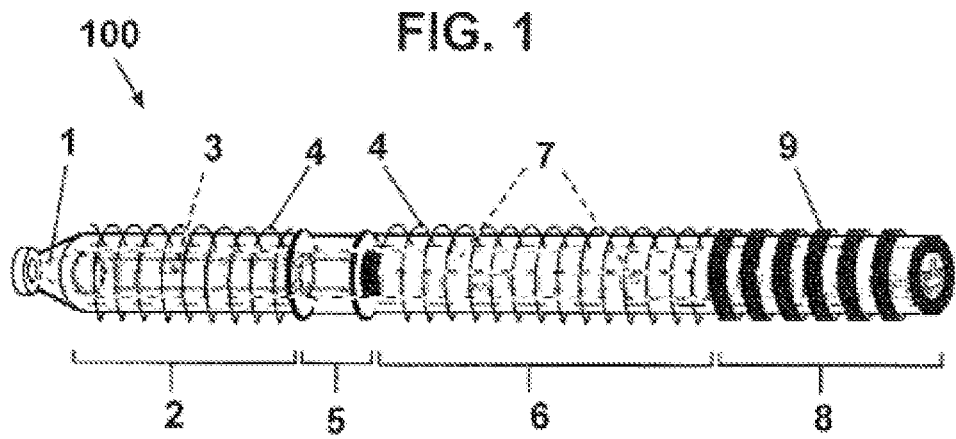
FIG. 1
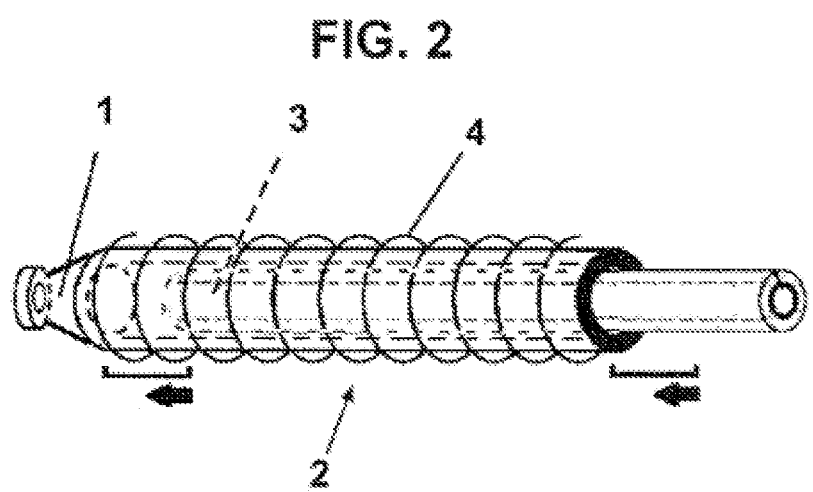
FIG. 2
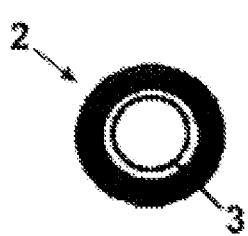
FIG. 3-A
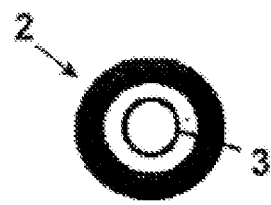
FIG. 3-B
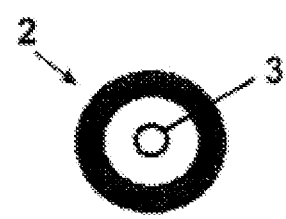
FIG. 3-C FIG. 4
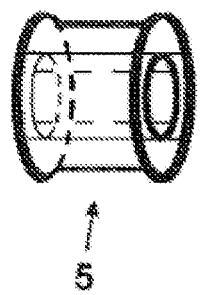
FIG. 5
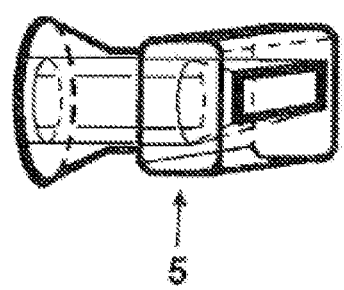
FIG. 6
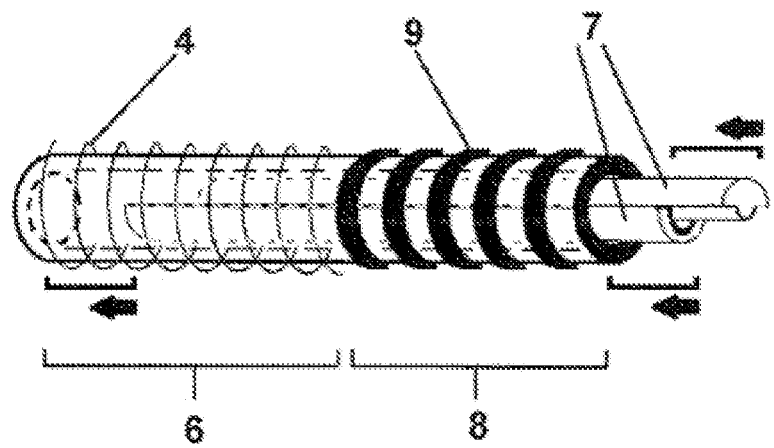
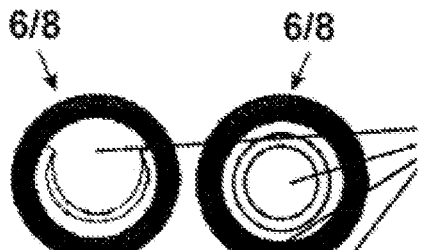
FIG. 7-A  FIG. 7-B
FIG. 7-C  FIG. 7-D FIG. 8
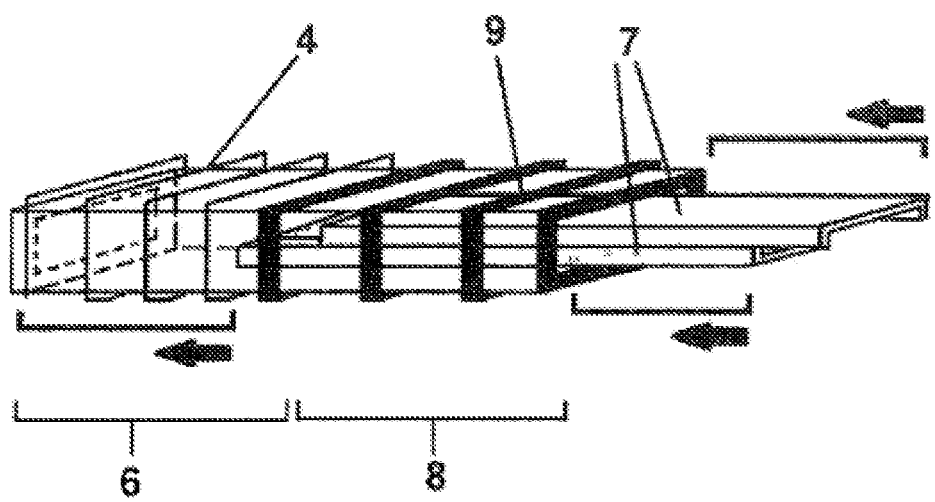
FIG. 9-A
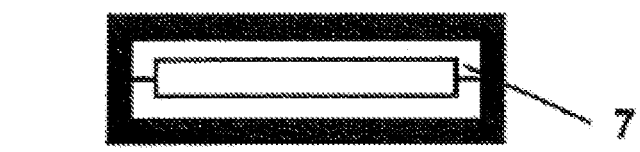
FIG. 9-B
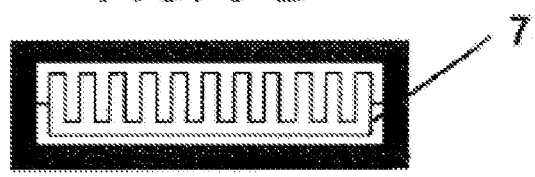
FIG. 9-C
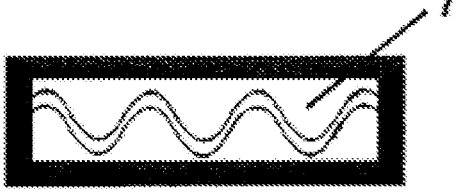

EXTRUSION DEVICE FOR THE PROCESSING OF PLASTICS, WHICH CAN BE COUPLED TO SYSTEMS FOR SUPPLYING THERMOSETTING AND THERMOPLASTIC POLYMERS

OBJECT OF THE INVENTION

The invention, as stated in the title of the present specification, relates to an extrusion device for the processing of plastics, which can be coupled to systems for supplying thermosetting and thermoplastic polymers and which provides advantages and novel features to its intended use that will be described in detail below.

The object of the present invention focuses on a device for obtaining products manufactured with resins on a continuous basis which, starting with a liquid or pasty state, and being formed by one or more components, provides rigid or flexible constant section polymers of indefinite length through a process that is similar to conventional extrusion.

The extrusion device has the capacity to process molten, fluid, liquid or pasty polymers such as thermoplastics, thermosetting thermoplastics or thermosetting resins, regardless of their nature and viscosity. In the case of thermoplastic polymers, the device of the invention acts as a material forming system, and can be supplied by any thermoplastic melting system or coupled to any type of extruder commonly used in the conventional extrusion of thermoplastics. In the case of thermosetting thermoplastics, its main function is to act as an external system to control the cross-linking of the polymer after it has been melted in the supply system, which can be any thermoplastic melting system or any type of extruder of the type commonly used in the conventional extrusion of thermoplastics. In the case of thermosetting resins, the device provided herein acts as a system for controlling the polymerisation and cross-linking of the resin, allowing the kinetics of the curing reaction to be modulated during its fluid state, its subsequent shaping and solidification in the section shape of the product, and its subsequent cooling to allow the fully rigid product at the outlet of the extrusion device to be conveyed and handled.

Furthermore, the protected subject matter includes an extruder designed for obtaining products manufactured with rigid or flexible polymers on a continuous basis by means of the extrusion of a polymer in liquid or pasty form and with one or more components, for which it stands out by comprising at least two reciprocating pistons that create a continuous flow at the outlet of an extrusion head where the material progressively moves forward towards the outlet of the extruder from at least two drive compartments, in which said pistons operate, which are arranged consecutively following the extrusion head such that the energy used for actuating the pistons is used for moving the entire mass of the polymer along the extruder and the coupled devices. The extruder of the invention has the capacity to process polymers such as thermosetting polymers or liquid or pasty thermosetting resins regardless of their nature and viscosity, which, in the case of thermosetting resins, are polymerised in a controlled manner by dosing a precise amount of catalyst from a separate catalyst dosing system that is mixed at will before it is poured into the drive compartments and applying a temperature profile through cooling and heating systems arranged along the extruder to control the reaction.

FIELD OF APPLICATION OF THE INVENTION

The sector of the state of the art in which the present invention is comprised corresponds to the continuous production of polymers, focusing particularly on the field of thermosetting resins for different products in the industrial and construction sectors, among others.

BACKGROUND OF THE INVENTION

This specification will describe the fundamentals, the characteristics and the problems to be solved related to the functionality of the extrusion device that will allow the manufacture of extruded products with thermosetting resins.

Currently, thermosetting resins are not normally used as raw materials in extrusion processes due to a lack of efficient technology. Thermosetting resins are often used in production models that are not fully automated other than extrusion, which is the process of transforming plastics with a higher production volume, followed by the injection-moulding process. This situation means that the products manufactured with these raw materials are limited to casting and injection applications in short series, which places these materials at a disadvantage in terms of competitive prices compared to conventional plastic materials. However, thermosetting resins nowadays are materials that are generating significant interest in high-tech sectors for applications in the fields of 3D printing, medicine, electronics, aeronautics and the automotive industry, among others. Despite the above, the aforementioned applications represent a very low consumption volume compared to the main applications of conventional thermoplastic materials. An additional fact to consider and that is proof of the special interest in the development of new plastic materials is that there is a situation that significantly favours the introduction of new materials on the market of products manufactured using the extrusion technique, since raw materials such as metals, cement and ceramics, among others, are giving way to products made of new plastic materials due to their lightness and increasing resistance.

The design of the configuration of the extrusion device constitutes the most important innovation, since its particular foundation differs significantly from the commonly used extrusion technology. With respect to conventional extrusion, where the foundation resides in the melting of a solid material to give it a shape following a subsequent solidification process, the extrusion of thermosetting resins described herein is based on the use of raw materials which, starting from the fluid or liquid state, provide a solid with a certain section shape at the outlet of the extrusion device following a chemical reaction process. This difference in the foundation of the new technology involves consequences that have a significant positive impact not only on the characteristics of the manufacturing process, but also on the properties of the extruded products that give way to the creation of new applications that would have been impossible using conventional thermoplastics until now. Therefore, the new extrusion device for thermosetting resins represents an innovative extrusion concept because it allows for the manufacture of existing products with new materials such as polyester, polyurethane, phenolic and epoxy resins, among others.

The configuration of the extrusion device of the invention solves the difficulty of processing thermosetting resins in conventional extruders. In conventional extrusion, thermoplastics pass from the molten state to the solid state when cooled very quickly for a few seconds, which makes it possible to give shape to the material through an extrusion mould with a very short path compared to the length of the extruder. In the case of thermosetting resins, the curing reaction takes place over a much longer period compared to the solidification time of thermoplastics, which is why a conventional extrusion mould is not useful to give shape to the part in a reactive system such as thermosetting resins, which necessarily involves using a completely different shaping system the design of which is described herein.

An important innovation provided in this new technology is the use of advanced technology such as nanotechnology and laser technology. Nanotechnology and laser technology can be used, in combination or alone, to provide the internal walls of the elements of the extrusion device with superhydrophobic protection that allows eliminating or minimising as much as possible the adhesion of the resins to any surface. It is precisely the adhesion of the resins, when they pass from the liquid to the solid state, which has caused the obstruction of the majority of the equipment designed in the past and has become one of the biggest challenges that has prevented the development of an efficient plastic extrusion model based on the use of thermosetting resins.

Furthermore, there are different types of extruders on the market which, depending on the type of material and application, can have very different configurations. Single or multi-screw extruders are the most widely used, even though they are limited to products that use thermoplastic raw materials. Thermoplastic raw materials can be processed on a continuous basis, as in extrusion, or on a discontinuous basis, as in injection, due to the fact that molten material can be processed at any time as long as it does not lose its molten state.

Other types of extruders include single-piston extruders, which can be used independently or coupled to screw extruders that supply the piston extruder. In most cases, single-piston extruders are used for the processing of thermoplastic materials brought to melting temperatures or when there are solvents present, as in the case of wet extrusion. Single-piston extruders have the particularity that they are used in discontinuous processes that require the application of significant pressure and in conditions of high viscosity, which also makes them suitable for the processing of thermosetting resins because the piston pushes the entirety of the material without leaving remains of the reacted material attached to the walls of the compartment housing the piston.

In many of the extrusion processes using thermosetting resins, the piston supplies reactive material to a cavity that is located at the outlet of the piston compartment. This cavity houses a limited amount of material that is pushed by the piston through a nozzle into a mould that is usually coupled to a press. That is why single piston-extruders are called piston injectors and operate on a discontinuous basis.

Due to the fact that the extruder is required to operate continuously in the process of manufacturing materials of indefinite length, existing piston extruders on the market are not useful for the processing of thermosetting resins because they exhibit several problems to operate continuously. One of the most common problems arises when the piston is pulled back after previously driving the material forward, be it a molten thermoplastic or a thermosetting resin that is reacting, where there are fluctuations in the flow, due to which the material is unable to move forward in a constant manner along the length of the extruder during this period. The consequence of these flow fluctuations in the case of a thermosetting resin is that there are several areas where the material is not cured in a homogenous manner, due to which its properties vary throughout the extruded part because of the different residence times of the reaction mixture in the cavity.

The continuous extrusion of thermosetting resins is a process that has very few references in the literature. Even though some processes for the extrusion of thermosetting resins have been described, many of them operate on a discontinuous basis such as that described in U.S. Pat. No. 4,240,997, where extrusion is carried out in phases and represents the main characteristic of the processing of thermosetting resins using single-piston extruders.

One of the few references that seem to address the problem in the most practical manner is that described in patent EP0494222B1. This patent tries to solve the fluctuations that occur in extrusion processes of thermosetting resins, although in said patent two piston pumps are used that create a continuous and sustained flow of material that flows through two interconnected hoses with different flow rates and converge in an extrusion head. The flow of the reactive material through these hoses generates an evident pressure drop, added to the increase in viscosity in the circuit of the reactive material. This pressure drop prevents the manufacture of large parts on a continuous basis or the processing of raw materials with high viscosity levels since much of the driving power generated with the piston pumps is lost along the circuit.

Due to the particularities described in the processing of thermosetting resins, it is not surprising then that on the market, single-piston extruders are limited almost exclusively to the production of injection-moulded parts. In fact, there are few products with thermosetting properties of indefinite length using resins as the main raw material on the market. The closest thing to these products with thermosetting properties and indefinite length are very exclusive materials such as cross-linked polyethylene or cross-linked polytetrafluoroethylene. These materials are usually flexible and are manufactured on a continuous basis with thermoplastic raw materials, which are chemically treated during a reactive extrusion process carried out in screw or single-piston extruders.

Furthermore, applications that require products of indefinite length with thermosetting properties have in many cases been solved by coating a preform with thermosetting resins, or by structures embedded with this type of resins in manufacturing processes, which have nothing to do with what is being described in the present invention.

The objective of the present invention is therefore to develop an improved extrusion device to enable the continuous processing of polymers, especially thermosetting resins, by including at least two pistons working in a coordinated manner, as will be explained below, to prevent the previously described drawbacks of existing devices and systems.

It can be therefore be affirmed that, using the current state of the art as reference, there is no other extrusion device that exhibits the same or similar technical and structural characteristics to those specifically exhibited by the invention claimed herein.

EXPLANATION OF THE INVENTION

The extrusion device for the processing of plastics, which can be coupled to systems for supplying thermosetting and thermoplastic polymers proposed by the invention, is therefore novel within its field of application, since according to its implementation, the aforementioned objectives are successfully achieved with the characterising details that distinguish it being conveniently set forth in the final claims attached to this description.

The main characteristic of the extrusion device of the present invention is its capacity to process on a continuous basis thermosetting resins that are polymerised inside same in a controlled manner by applying a temperature profile along the device to control the reaction kinetics and the properties of the extruded product.

Specifically and as noted above, the invention proposes an extrusion device that can be coupled to different systems for supplying catalysed resin and whose products can be fibres, threads, rods, bars, pipes, profiles, sheets, plates, blocks and any other type of rigid or flexible material manufactured on a continuous basis by extrusion in the liquid or pasty form of thermosetting resins with one or more components, such as polyester, epoxy, phenolic, polyurethane, polyurea and other similar resins.

More precisely, the extruder of the invention essentially comprises at least one of the following systems called modules, through which the catalysed resin, where the reaction takes place, flows, such as a heating-reaction system or module, a heating-shaping system or module and a cooling-solidification system or module. These modules may be separate or be part of one or more integrated modules with the same functions as those described below.

The heating-reaction module, which is optional, is responsible for providing a heated path to accelerate the curing reaction therein. Depending on the type of product to be extruded, if it has an elongated geometry, for example a rod, a tube, a profile or the like, the shape of the inner section through which the resin flows will preferably be cylindrical to minimise friction and adhesion to the inner wall. Even though other shapes are possible, shapes other than a cylindrical shape are not advisable since the heat transfer is more homogeneous with this geometry. In this area of the extrusion device, the resin must remain in a state that is still fluid since the manufactured part will not be shaped. Another advantage of the cylindrical shape of the reaction device is that it makes it possible to modify the inner section of the heating-reaction system by introducing interchangeable hollow cylinders with a different internal section area to adapt said area to the geometric section of the part to be manufactured. If the product is in the form of a sheet or plate, the heating-reaction module can take a flat shape or use a coupling having a flat geometry to distribute the liquid resin before it enters the heating-shaping module following the heating-reaction module.

The heating-shaping module is responsible for giving shape to the part during the process of gelling the resin in a manner that is similar to the function of the conventional extrusion mould. This module can also be heated to ensure that the surface of the part has been sufficiently cured to allow it to slide along the inner surface of the heating-shaping module with the least possible friction. To give shape to the part, the heating-shaping module houses therein inserted interchangeable detachable parts the inner section of which results in the geometric shape of the extruded product. The most important advantages of using interchangeable detachable parts is firstly, to provide products having multiple geometric shapes with the same heating-shaping module, and secondly, to allow the extrusion device to be easily removed and cleaned in the event of obstruction.

The cooling-solidification module has essentially the same configuration characteristics as the heating-shaping module, except for the fact that the temperature applied must be much lower to ensure that the outgoing part is completely rigid and can be handled without deforming it. However, the heating-shaping module and the cooling-solidification module could be part of the same module with different temperatures, where the length of the interchangeable internal elements that give shape to the product therein passes through the entire integrated module.

The extrusion device designed herein can be constructed with materials such as iron, steel, aluminium, brass, bronze or any other material, metallic or not, with a high heat transfer coefficient. The inner surfaces of the internal elements such as the hollow cylinders of the heating-reaction system and the insertable interchangeable detachment parts of the heating-shaping and cooling-solidification modules must be completely smooth and preferably mirror polished in the case of metals, or manufactured or coated with a non-stick material so that the friction coefficient is as low as possible and the resin flows without adhesion problems along said internal walls.

As an optional and recommended element and in order to minimise the adhesion of the resins to the walls during the entire curing process, a coating of a permanent superhydrophobic material that is heat and abrasion-resistant can be applied. The application of a superhydrophobic coating is important, especially in the heating-shaping module, which is where the greatest degree of adhesion will occur due to the gelation of the resin. In order for the gelling of the resin to occur in the heating-shaping module, the catalysis time during the gelling process must be very well controlled with the appropriate amount of catalyst and taking into account the temperature profile applied along the extrusion device.

An alternative to the superhydrophobic layer, when it comes to metal surfaces, is the application of a special laser treatment on the inner surface of the hollow cylinders and interchangeable detachable parts. This treatment described by its authors, Chunlei Guo and Anatoliy Vorobyev of the Institute of Optics attached to the University of Rochester, will provide the metals with permanent superhydrophobic protection.

Optionally, a conveyance system formed by rollers, wheels or any other similar system acting as a traction system for the output material can be attached at the outlet of the extrusion device. The conveyance system will facilitate the output of the part by reducing the inner pressure of the device, thus reducing the likelihood of an obstruction and enabling the subsequent conveyance of the product.

Optionally, a heating system can be coupled at the outlet of the extrusion device to subject the part to a post-curing process in order to accelerate curing in solid phase and improve its properties after manufacture. This system can be a device that applies hot air, infrared irradiation or any other system that transfers heat by convection, conduction or electromagnetic irradiation.

The supply system or extrusion module coupled to the extrusion device may optionally be a conventional extruder; a system consisting of deposits, tanks, stirrers, paddle mixers, liquid jet mixers, piston pumps, gear pumps, peristaltic pumps or pressurized tanks; an injection system that operates continuously; or any other system that provides sufficient pressure to drive the entire mass of reactive resin along the interior of the extrusion device. In order to prevent obstruction of the extrusion device, the pressure that the supply system must exert is a very important factor that must be controlled due to the mentioned problems concerning adhesion of the resins to the internal walls of the interchangeable detachable parts.

The preferred supply system or extrusion module is based on the reciprocating movement of two pistons creating a continuous flow at the outlet of an extrusion head specially designed so that the material progressively reacts towards the outlet of the extruder. Thanks to its configuration in which two drive compartments are arranged consecutively following an extrusion head, the extruder prevents pressure drops and flow fluctuations throughout the entire process. Thanks to this special configuration, virtually all the energy used to actuate the pistons is used for moving the entire mass of the reaction mixture along the extruder and the coupled devices. This configuration gives the extruder enough power to process any type of polymer such as a resin, regardless of its viscosity, and makes it possible to manufacture parts with a volume proportionally greater than the size of the extruder, enabling it to process virtually all thermosetting resin formulations existing on the market.

More precisely, the supply system or extrusion module of the invention essentially comprises at least one polymer inlet line that supplies at least two independent drive compartments housing one piston each and which push the polymer towards an extrusion head arranged consecutively following said drive compartments where the flows from both drive compartments converge to create a single continuous and sustained polymer flow.

Thus, in the preferred embodiment, the supply system or extrusion module is prepared to extrude thermosetting resins and comprises at least one inlet duct through which a resin stream driven by a pumping system flows towards an external mixer, where it is mixed with the catalyst system that is supplied by a precision dosing device, and from which, through corresponding supply ducts, the resin and catalyst mixture is driven to a drive area, which comprises two adjacent cylindrical compartments, and introduced into each drive compartment, where it is preferably maintained at a low temperature by means of cooling systems, and is driven by the reciprocating actuation of two drive motors that move respective pistons in a synchronised manner in each drive compartment, creating two equal alternate material flows that converge in the extrusion head located at the end thereof and to which systems and devices which are compatible with the extrusion processes commonly found in the thermoplastics sector can be coupled.

A key element of the configuration of the supply system or extrusion module described is the existence of the independent precision dosing device that is connected to the external mixer. The main function of the catalyst dosing device is to start and stop the extruder. In this last phase of the production process, it is necessary for the dosing device not to act to ensure that the resin remains catalyst-free and that an adequate amount of non-reactive resin flows. By flowing, the catalyst-free resin makes it possible to clean the entire machine from the external mixing device to the coupled devices, where the non-catalysed resin can be recovered so as to re-incorporate it into the supply circuit and minimise the material losses in stopping operations.

Another very important function is to regulate the rate of curing of the reactive mixture, where the reaction kinetics can be adapted to the length of the extruder according to optional devices which can be coupled thereto. The catalyst system can be made up of a single catalyst or several catalysts of the same or of a different chemical nature. The catalysts used can be immediate, delayed or latent action catalysts, where the latter can be activated with heat, pressure, electromagnetic radiation sources, or by means of any other internal or external stimulus.

The arrangement of the extrusion head with respect to the drive compartments is another key element in the configuration of the extruder because since it is located right after the drive compartments, all the mechanical energy is used for moving the material along the extruder and the optional devices. The extrusion head has the function of providing a single continuous flow rate of the reactive mixture at its outlet towards the following optional devices which can be coupled to the extruder. The head may or may not contain mechanical gates or any other device which opens and closes the passage of material to ensure a sustained flow rate from the flows coming from the drive compartments.

In one embodiment option, it has a single articulated gate which alternately closes the outlet passage of the drive compartments, being synchronised with the actuation of each piston. Furthermore, in a second embodiment option, the gate is a sliding double gate.

Optionally, for the processing of thermosetting resins with one or more components, which may in turn consist of the mixture of several base raw materials or resins, the extruder can be preceded by a pre-mixing zone with agitated tanks and chambers in which the non-reactive formulated material prepared with additives and/or fillers which is supplied to the reactive mixing device is prepared and concentrated. In the particular case of resins with two components, one of its components that does not react with the catalyst can be previously formulated in the pre-mixing zone including a suitable amount of catalyst, eliminating the need for the dosing system, although there would be less precise control of the reaction kinetics.

One of the advantages of this production process with respect to the analogous conventional thermoplastic material extrusion process relates to energy consumption. In the case of the device designed in the present invention, the most important energy consumption factor is the pushing force of the pistons, although consumption will not be as high as in the case of the thermoplastics extrusion, where the mechanical and heat energy supply is a factor that has a significant impact on the final price of the product. The high consumption of the energy required in conventional extrusion processes due to the high viscosities and temperatures they use, together with the energy expenditure required by the friction and shearing process, is also rather costly in environmental terms when taking into account the carbon footprint given off throughout the entire process.

Another one of the advantages relates to the simplicity of the process in which, in the case of thermoplastic materials, from the time the primary material is originated in a reactor in the form of powder until it is transformed into a final product, there are several or multiple extrusion processes, or at least two. After a first extrusion to obtain the first granules that need to be formulated with process additives, plasticisers, antioxidants, UV protectants and reinforcing filler additives, among others, there is at least a second extrusion in order to give shape to the final product. Given the simplicity of the process and the characteristics of the raw materials which can be used with the present invention, there are also significant advantages in terms of the range of products that can be manufactured in the same facilities.

The very nature of thermosetting resins enables a higher customisation capacity since it should be taken into account that thermoplastic material converters must acquire the granules from the raw material manufacturer already formulated, which granules already have predefined characteristics after polymerisation in synthesis reactors at the manufacturer's facilities. As a result, the thermosetting resin transformer can vary the properties in real time, being able, for example, to alternate, on a continuous basis, segments of materials with different properties by simply varying the raw material input streams.

As far as the product is concerned, compared to thermoplastics, the thermosetting materials generally exhibit a higher temperature resistance, higher dimensional stability, low gas and liquid permeation, and depending on the type of resin, higher chemical, solvent and corrosion resistance, greater durability, greater hardness and greater resistance to abrasion, among other advantages which, as previously stated, depend on the resin used. Therefore, the products that can be manufactured with this technology exhibit the characteristic advantages conferred to them by new materials capable of being processed for the purpose of this invention.

In summary, with the configuration of the new extrusion device described, the following results can be achieved:

- the production process and the number of steps needed until obtaining the final product are simplified;
- the energy consumption of the process of transformation from the base raw material to the final product is reduced;
- the final transformer is able to have an influence on the properties of the product in order to customise it according to the required application;
- new properties are conferred to existing products by incorporating new materials which are current not present in said applications as there is no existing technology suitable for producing them and solving the problems that have prevented up until now the development of an efficient technology for the extrusion of thermosetting resins;
- high productivity technology is provided for products with thermosetting properties conferred by thermosetting resins;
- a low cost system that allows adapting the extrusion process to the chemical reaction of thermosetting resins is provided;
- a simple, versatile, easy-to-handle and easy-to-clean system is provided.

The extrusion device for the processing of plastics which can be coupled to systems for supplying thermosetting and thermoplastic polymers therefore consists of an invention having characteristics that were unknown up until now for its intended purpose, and these reasons, combined with its practical usefulness, confer to said invention sufficient grounds for obtaining the exclusive privilege that is sought.

DESCRIPTION OF THE DRAWINGS

To complement the description that is being made and for the purpose of helping to better understand the features of the invention, several sheets of drawings are attached to the present specification as an integral part thereof, in which the following is depicted in an illustrative and non-limiting manner:

FIG. 1 shows a schematic perspective side view of an example of the complete extrusion device having a cylindrical geometry, where the main parts and elements it comprises can be seen;

FIG. 2 shows a schematic perspective side view of the heating-reaction module of the device object of the invention in a cylindrical example thereof according to the example shown in FIG. 1, which can be coupled to different devices for supplying polymers, where its main parts and elements can be seen;

FIGS. 3-A, 3-B and 3-C show respective front elevational schematic views of the cylindrical heating-reaction module shown in FIG. 2, in examples with different sizes of the interchangeable hollow cylinders which allow obtaining different internal section areas contemplated in the device of the invention;

FIG. 4 shows a schematic perspective side view of an example of the shaping coupling part contemplated in the device of the invention, in an example of same having a cylindrical geometry;

FIG. 5 shows a schematic perspective side view of an example of the shaping coupling part contemplated in the device of the invention, in another example of same having a rectangular geometry;

FIG. 6 shows a schematic perspective side view of the heating-shaping module in a cylindrical embodiment with a configuration designed so that it can be integrated with the cooling-solidification module object of the invention, where its main parts and elements can be seen;

FIGS. 7-A, 7-B, 7-C and 7-D show front elevational schematic views of the heating-shaping module shown in FIG. 6 with different product geometries contemplated in the device of the invention;

FIG. 8 shows a schematic perspective side view of the heating-shaping module in a rectangular embodiment with a configuration designed so that it can be integrated with the cooling-solidification module object of the invention, where its main parts and elements can be seen; and FIGS. 9-A, 9-B and 9-C show front elevational schematic views of the heating-shaping module rectangular shown in FIG. 8 with different product geometries contemplated in the device of the invention;

PREFERRED EMBODIMENT OF THE INVENTION

Figure 10:
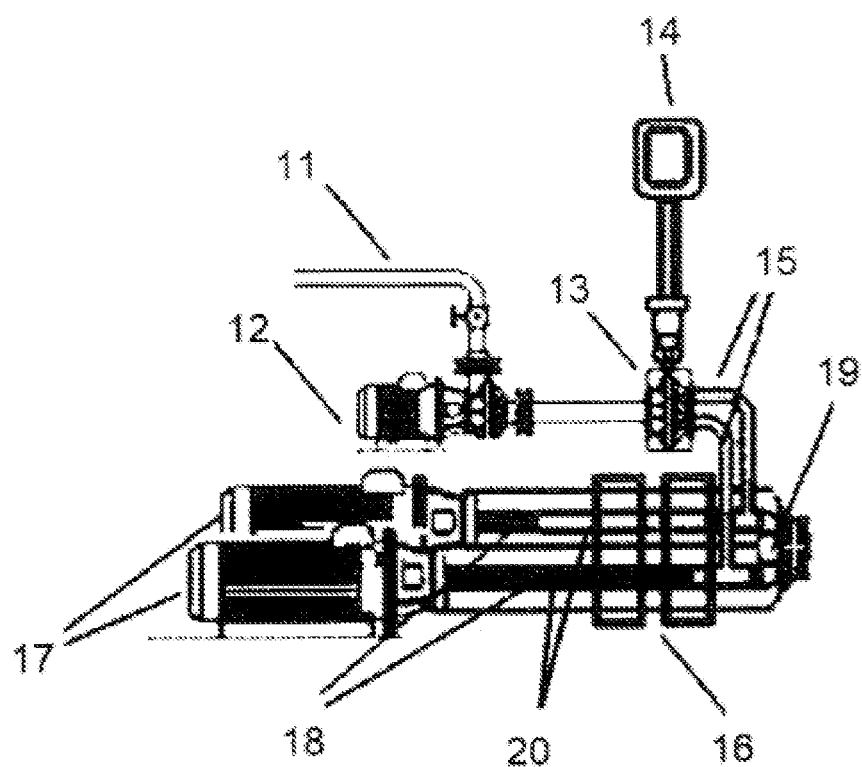
FIG. 10 shows a side schematic view of a basic example of an extrusion module which can be coupled to the extrusion device, in which the main parts and elements forming it can be seen.

In view of the mentioned drawings and according to the numbering used, non-limiting examples of the extrusion device for the processing of plastics, which can be coupled to systems for supplying thermosetting and thermoplastic polymers of the invention, which comprises the parts and elements indicated and described in detail below, can be observed therein.

Thus, as can be observed in said drawings, the extrusion device (100) of the invention, which can be coupled to systems for supplying polymers in a fluid, liquid or pasty state through a supply coupling (1) for the processing of plastic materials and for obtaining products made of a rigid or flexible material manufactured on a continuous basis, is essentially configured from an internally hollow set of modules through which the catalysed resin material, where the reaction takes place, flows, comprising at least: a heating-shaping module (6) in which the material undergoes a new temperature increase and takes on the desired shape; and a cooling-solidification module (8) in which the material with the shaped form transitions from liquid to solid state.

Preferably, the extrusion device also comprises a heating-reaction module (2) upstream of the heating-shaping module in which the material undergoes a first temperature increase.

The complete design of said extrusion device (100) is depicted in FIG. 1 in an example having a cylindrical configuration, which is the simplest geometry and the basis for which is explained in detail below. At the inlet of the device (100) where the supply coupling (1) is located, the catalysed resin supplied by a continuous injection system or any other supply system optionally penetrates the heating-reaction module (2), accessing the interior of an interchangeable hollow cylinder (3) provided in said module inside of which the resin undergoes a temperature increase along its path due to the heat supplied by an external heating system (4) provided for that purpose, where the latter can be an electrical resistance, the flow of a hot fluid or any other heating system. The resin subsequently moves forwards towards the end of the heating-reaction module (2) flowing through the interior of a shaping coupling (5), which can be cylindrical or rectangular, from the interchangeable hollow cylinder (3) until reaching the heating-shaping module (6) which has the same section as the coupling (5).

Inside the heating-shaping module (6), the material undergoes a new temperature increase caused by the auto-acceleration of the curing reaction and the heat supply provided by another external heating system (4) which may be at a higher temperature than the previous one. The increase in viscosity inside the heating-shaping module (6) is very high and sudden, which generates a rapid increase in pressure that is offset by the pushing pressure of the supply system, allowing the reactive material to slide over the surface of the interchangeable detachable parts (7) in order to give the desired shape, which parts are provided in the heating-shaping module (6) where the change of state from liquid to solid takes place. After this solidification, the material moves forward towards a cooling-solidification module (8), which in the specific example depicted in FIG. 1 is integrated with the heating-shaping module (6).

Specifically, in said example, there has been installed around the cooling-solidification module (8) a cooling system (9) which uses water or any other cooling system, which cools the part to ensure its rigidity and prevent its deformation in the subsequent conveyance at the outlet of the extrusion device (100).

The optional heating-reaction module (2) is depicted in FIG. 2, which shows the aforementioned elements as well as, in greater detail, the inner interchangeable hollow cylinder (3) which has a length that is longer than the heating-reaction module (2) so that it can penetrate the shaping coupling (5), which is cylindrical in said example, and the end thereof can be located right at the inlet of the also cylindrical heating-shaping module (6). The inner interchangeable hollow cylinder (3), can have different diameters and inner section areas, as depicted in FIGS. 3-A, 3-B and 3-C.

Considering FIG. 4, there is schematically shown an example of the shaping coupling (5) the through-hole of which is cylindrical at both ends for connecting the heating-reaction module (2) with an also cylindrical heating-shaping module (6) normally used to manufacture articles having a short section with respect to the length of the product, such as tubes, bars, profiles and the like.

Considering FIG. 5, there is schematically shown another example of the shaping coupling (5), in this case being one that is hollow and cylindrical at a first end and rectangular at the opposite end for connecting the heating-reaction module (2) with a rectangular heating-shaping module (6) normally used to manufacture articles having a long section with respect to the length of the product, such as sheets, plates, blocks and the like.

The cylindrical heating-shaping module (6) is depicted in FIG. 6, where it can be seen that it is integrated with an also cylindrical cooling-solidification module (8), the aforementioned elements and parts of which are shown in said figure and in FIGS. 7-A to 7-D, where it can be seen that the interchangeable detachable parts (7), which can exhibit various shapes to give shape to the product being output from the extrusion device, also exhibit an external shape having a cylindrical geometry, in accordance with that of the heating-shaping module (6) and the cooling-solidification module (8).

In turn, FIG. 8 shows the option of a rectangular heating-shaping module (6), in which it is integrated with an also rectangular cooling-solidification module (8), and the aforementioned elements and parts of which are shown in the diagram and in greater detail, for example the interchangeable detachable parts (7) used to give shape to the product being output from the extrusion device, which are also rectangular in shape, where they can have different inner section shapes as depicted in FIGS. 9-A, 9-B and 9-C.

It should finally be mentioned that the polymer for which the device is intended can be a thermosetting resin, a thermoplastic polymer or a thermosetting thermoplastic.

The extrusion module of the present invention is depicted in FIG. 10 in its simplest configuration. An inlet duct (11) through which a resin stream driven by a pumping system (12) flows towards an external mixer (13) in which it is mixed with the catalyst supplied by a precision dosing device (14) reaches the reactive mixing zone. The entry of air into the mixing device is not allowed during mixing with the catalyst to prevent the presence of bubbles in the final product. Two supply ducts (15) with reactive mixture streams coming from the external mixer (13) reach the drive zone comprising two adjacent cylindrical compartments (20), at the ends thereof. The reactive mixture is introduced in each drive compartment (20), which can be kept at a low temperature by cooling systems (16). The drive zone can be kept at a low enough temperature such that the material reacts slowly so that its viscosity does not increase in a considerable manner and so that the reactive mixture can be pushed without attaching to the walls of each drive conduit. The reactive mixture is driven by the reciprocating actuation of two drive motors (17) moving respective pistons (18) in a synchronised manner, creating two likewise alternate material flows which converge in the extrusion head (19) where systems and devices compatible with the usual extrusion in thermoplastics can be coupled.

It is important to point out the existence of the independent precision dosing device (14) which supplies the catalyst to harden the resin and is connected to the external mixer (13), allowing activation and deactivation of the drive system with resin in the absence of catalyst in order to clean the entire machine.

Another important element to be pointed out are the cooling means (16) which allow regulating the rate of curing of the reactive mixture, where the reaction kinetics can be adapted to the length of the extruder.

It is also important to point out the arrangement of the extrusion head (19) right after the drive compartments, causing all the mechanical energy to be used for moving the material along the extruder and the optional devices coupled to said head (19).

To obtain the outlet of a sustained flow rate, the head preferably has a gate (21), where two alternative embodiment options of same have been provided.

Figure 11:
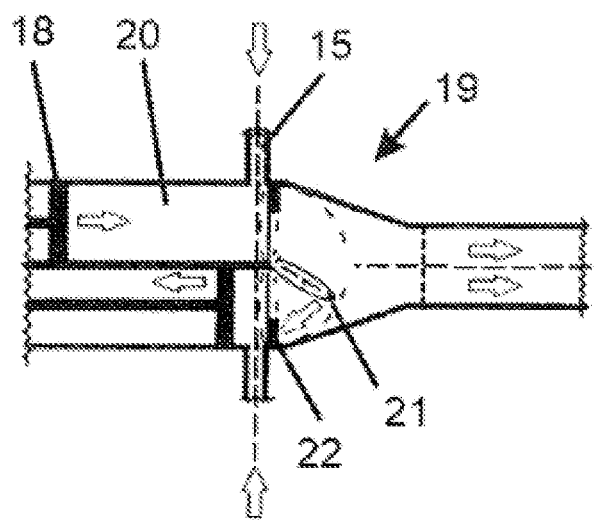
FIG. 11 shows a side schematic view of the extrusion head having a single articulated gate optionally provided in the extruder of the invention.
Figure 12:
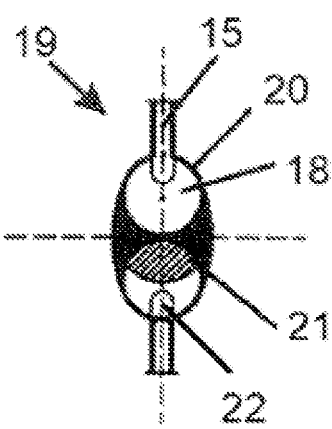
FIG. 12 shows a front view of the extrusion head having a single articulated gate shown in FIG. 2.

Thus, in a first embodiment option, which can be seen in FIGS. 11 and 12, the head (19) has a single articulated gate (21) alternately covering the outlet of one drive compartment (20) or another. Specifically, the operation thereof is as follows: while a first piston (18) pulls back into the drive compartment (20) which is being filled through the supply conduit (15), there is at its outlet an articulated gate (20) which closes the passage, preventing the reactive mixture from being pulled back due to the pressure exerted by the forward movement of the piston (18) of the adjacent drive compartment, and when the action of this second piston (18) ends and the forward movement of the first piston is caused, the articulated gate (21) is moved by the actual drive of the material so as to open the outlet it was covering and cover the outlet that was open, and so on and so forth.

The articulated gate (21) is synchronised with the actuation of each piston (18) and can be immobilised by a blocking system (22) during the filling of the drive compartment (20). Optionally, the movement of the articulated gate could be controlled by a mechanism or system which controls the closing and opening of the gate.

Figure 13:
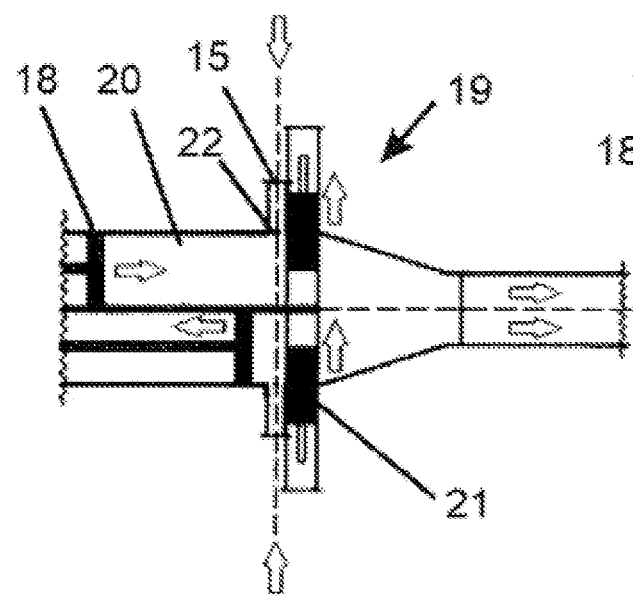
FIG. 13 shows a side schematic view of the extrusion head having the sliding double gate optionally provided in the extruder of the invention.
Figure 14:
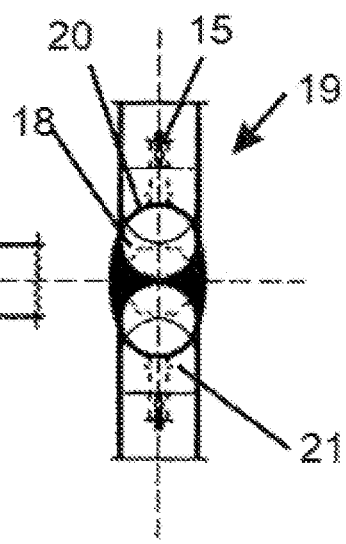
FIG. 14 shows a front view of the extrusion head having the sliding double gate according to the invention, shown in FIG. 4.

FIGS. 13 and 14 depict a second embodiment option, in which the gate (21) is a sliding double gate the operation of which consists of while the piston (18) of one of the drive compartments (20) is pulled back because that latter is being filled through the supply conduit (15), there is a sliding double gate (21) at its inlet which is operated in a synchronised manner, alternately shutting and opening the passage in both compartments (20) in a manner that is perpendicular to the flow of reactive mixture, preventing the re-entry of material into same coming from the adjacent compartment.

In this embodiment option, there is preferably provided at the ends of each supply conduit (15), right at the inlet of each drive compartment and before the head (19), the existence of a check valve (23) which prevents material from being pulled back towards the mixer (13).

Figure 15:
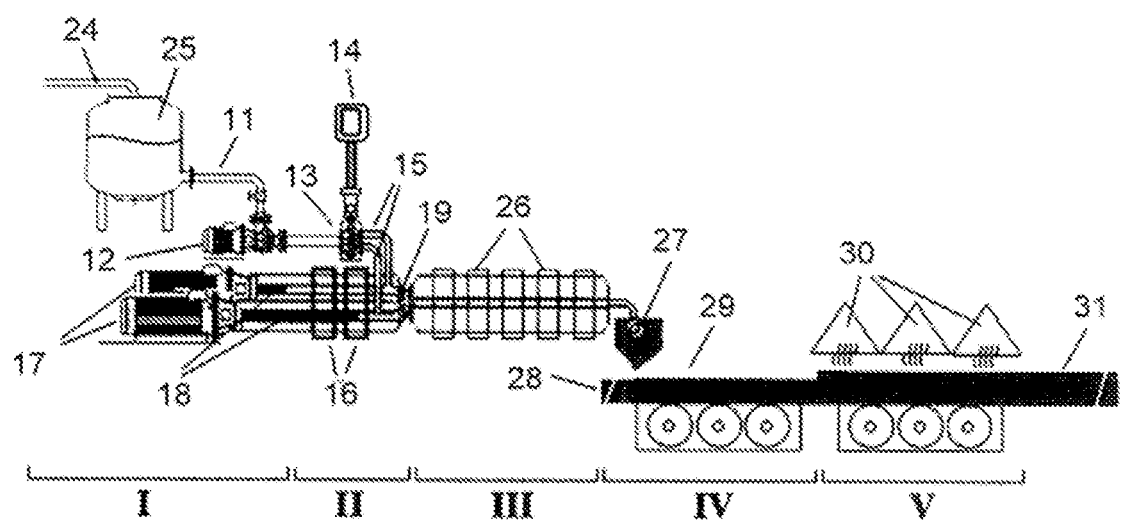
FIG. 15 shows a side schematic view of the extruder of the present invention in an embodiment of same with a configuration designed for coating substrates with resins with one component.

FIG. 15 shows a schematic depiction of an example of the extruder of the invention with two reciprocating pistons for thermosetting resins with one component coupled to a device for coating substrates having an indefinite morphology and undetermined length.

Furthermore, as can be seen in said FIG. 15, the extruder preferably comprises a raw material supply and mixing zone (I), a drive zone (II), a reaction zone (III), a substrate coating zone (IV) and a post-curing zone (V) for the coated material.

At the beginning of the supply zone, a supply line (24) for supplying resin or a mixture of liquid resins provides raw material to a chamber (25), which is in turn communicated through an inlet conduit (11) with a pumping system (12) which supplies an inlet flow rate into the mixing device (13) in which the resin is mixed with a catalyst supplied by a precision dosing device (14). At the outlet of the mixing device (13), the reactive mixture is split into two flows with an equivalent flow rate, said flows being sent through the supply conduits (15) of the extruder. The two flows of the reactive mixture enter respective equivalent drive compartments (20) when one of the pistons (8) is withdrawn and by actuating the motors (17), the latter push the pistons (18) in a reciprocating manner, with each compartment being cooled by water or another coolant flowing through the cooling circuit (16). The reactive mixture from each compartment is driven towards the extrusion head (19) from which a single flow rate is output on a continuous and constant basis towards the reaction zone.

Figure 16:
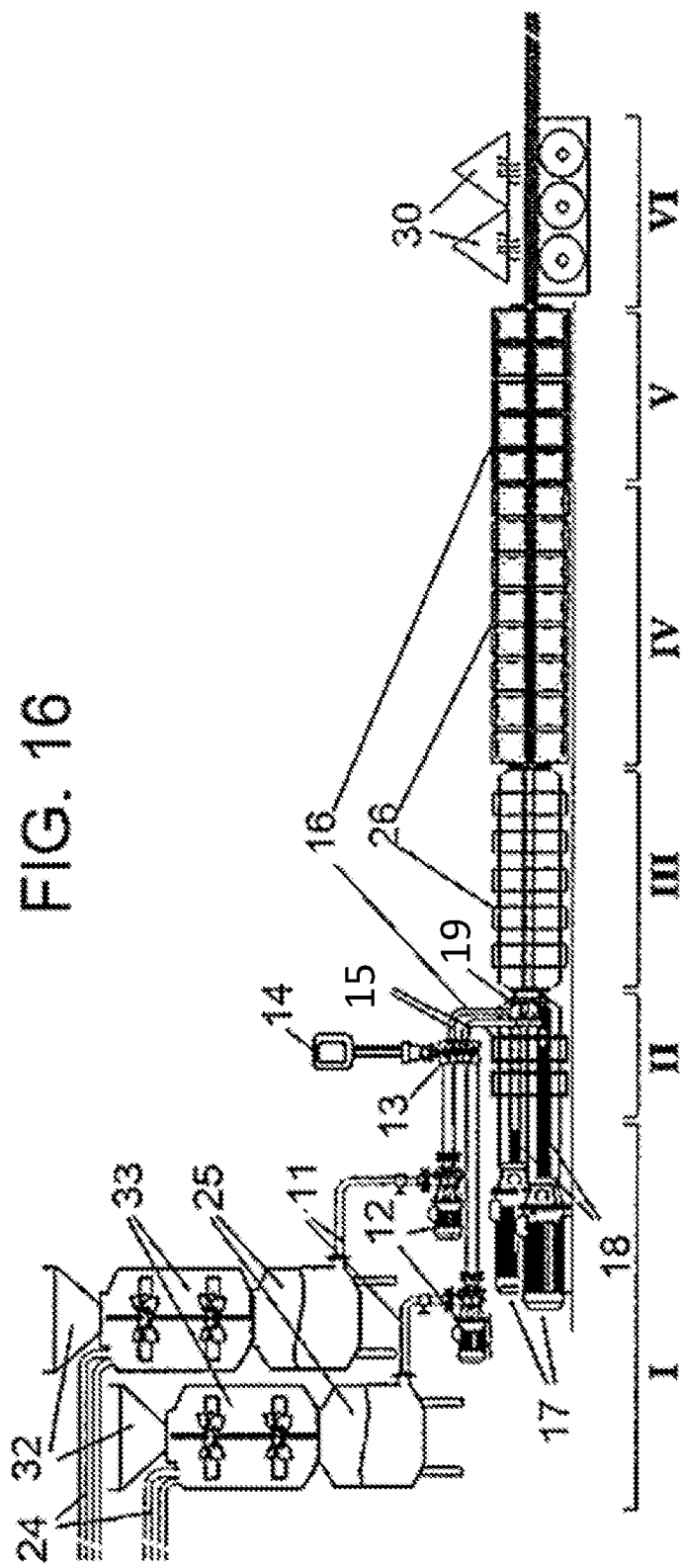
FIG. 16 shows a side schematic view of the extruder according to the invention in another example of same with a configuration designed for the manufacture of structural materials reinforced with resins with two components or multiple components.

Considering FIG. 16, there can be observed another embodiment of the extruder of the invention, with to reciprocating pistons for thermosetting resins with two components or multiple components coupled to several devices which allow the shaping, solidification and post-curing for the manufacture of structural products having a constant and indefinite section reinforced with solid fillers.

Thus, in said example the extruder comprises a raw material supply and mixing zone (I), a drive zone (II), a reaction zone (III), a shaping zone (IV), a solidification zone (V) and a post-curing zone (VI) for the manufactured material.

At the beginning of the supply zone supply lines (24) for supplying two liquid raw materials and a supply hopper (32) for supplying additives and/or solid fillers in each component of the resin send raw material to pre-mixing agitating tank (33) operating on a discontinuous basis in which all the ingredients of the formulation of each component of the resin are mixed and dispersed. Each agitated tank is communicated with a chamber (25) containing the formulation of each component of the resin prepared in the upper tank, which is in turn communicated through an inlet conduit (11) with a pumping system (12) supplying the inlet flow rates at a suitable ratio towards the mixing device (13) in which both components of the resin are mixed with a catalyst supplied by a precision dosing device (14). At the outlet of the mixing device (13), the reactive mixture is split into two flows with an equivalent flow rate which are sent through the supply conduits (15) of the extruder. The two flows of the reactive mixture enter respective equivalent drive compartments (20) when each piston (18) is withdrawn and by alternately actuating the motors (17), the latter push the pistons (18) such that, with each compartment being cooled by water or another coolant flowing through the circuit of the cooling system (16), the reactive mixture of each compartment is driven towards the extrusion head (19) from which a single flow rate is output on a continuous and constant basis towards the reaction zone.

It should also be clarified that in some of the drawings arrows are included which indicate the position that the depicted element must end up having, not to be confused with the sliding direction of the material, since this is the opposite, and it goes from the supply coupling (1), where it penetrates up to the opposite end, at the end of the cooling-solidification module (8) where the element is ejected with the desired shape according to the shape that the interchangeable detachable parts (7) have.

Having sufficiently described the nature of the present invention as well as the manner of putting it into practice, it is not considered necessary to extend the explanation thereof so that one skilled in the art can understand its scope and the advantages derived from it, and it is hereby stated that within its essential nature, the invention may be carried out to practice in other embodiments which differ in detail from that indicated by way of example and will likewise covered by the protection that is sought provided that the fundamental principle thereof is not changed, altered or modified.

The invention claimed is:

1. An extrusion device for the processing of plastics, which can be coupled to systems for supplying, mixing and driving thermosetting resins in a fluid, liquid or pasty state for the processing thereof which, being applicable for obtaining products made of a rigid or flexible material manufactured on a continuous basis, comprises an internally hollow module and/or set of modules through which a material to be extruded flows, comprising at least: a heating-shaping module in which the material to be extruded undergoes a temperature increase and takes on a desired shape; and a cooled cooling-solidification module, in which the material to be extruded undergoes a temperature decrease and takes on the desired shape for the purpose of favouring its rigidity and subsequent handling at an outlet of the extrusion device; characterised in that the cooling-solidification module contains an internally hollow interchangeable detachable part that is slidable between the heating-shaping module and the cooling-solidification module and that is formed of at least two portions that are slidable relative to one another, and which together generate a hollow having a shape inside which a resin flows, providing the resin with a shape of a product to be extruded.

2. The extrusion device for the processing of plastics, which can be coupled to systems for supplying, mixing and driving thermosetting resins according to claim 1, characterised by the existence of a heating-reaction module upstream of the heating-shaping module, the heating-reaction module comprises a first external heating system and an interchangeable hollow tube having a diameter, and inside which the resin to be extruded flows, the resin experiencing a first temperature increase along its path due to the heat supplied by said first external heating system.

3. The extrusion device for the processing of plastics, which can be coupled to systems for supplying, mixing and driving thermosetting resins according to claim 1, characterised in that the heating-shaping module, which precedes and is coupled to the cooling-solidification module, contains the interchangeable detachable part or a group of two or more interchangeable detachable parts which generate the hollow having the shape inside which the resin flows in order to give the desired shape of the product to be extruded, the resin experiencing a temperature increase along its path due to the heat supplied by an external heating system.

4. The extrusion device for the processing of plastics, which can be coupled to systems for supplying, mixing and driving thermosetting resins according to claim 1, characterised in that the cooling-solidification module is integrated with the heating-shaping module.

5. The extrusion device for the processing of plastics, which can be coupled to systems for supplying, mixing and driving thermosetting resins according to claim 2, characterised in that a shaping coupling is incorporated between the heating-reaction module and the heating-shaping module.

6. The extrusion device for the processing of plastics, which can be coupled to systems for supplying, mixing and driving thermosetting resins according to claim 2, characterised in that the interchangeable hollow tube has a length that is longer than the heating-reaction module so that it can penetrate a shaping coupling and an end thereof can be located right at an inlet of the heating-shaping module.

7. The extrusion device for the processing of plastics, which can be coupled to systems for supplying, mixing and driving thermosetting resins according to claim 6, characterised in that the heating-shaping module is tubular and the shaping coupling has a through-hole which is cylindrical at both ends for connecting the heating-reaction module with said tubular heating-shaping module.

8. The extrusion device for the processing of plastics, which can be coupled to systems for supplying, mixing and driving thermosetting resins according to claim 7, characterised in that the tubular heating-shaping module is integrated with the cooling-solidification module which is also tubular.

9. The extrusion device for the processing of plastics, which can be coupled to systems for supplying, mixing and driving thermosetting resins according to claim 5, characterised in that the heating-shaping module is rectangular and the shaping coupling has a through-hole which is cylindrical at a first end and rectangular at the opposite end for connecting the heating-reaction module with said rectangular heating-shaping module.

10. The extrusion device for the processing of plastics, which can be coupled to systems for supplying, mixing and driving thermosetting resins according to claim 1, characterised by further comprising an extrusion module comprising a circuit through which a polymer flows into at least two drive compartments, each of which is provided with a reciprocating piston, which communicate with an extrusion head such that they create a continuous product flow towards said extrusion head located right after said drive compartments and in which outputs of both compartments converge, such that the energy used for actuating the pistons is used for moving a product mass.

11. The extrusion device for the processing of plastics, which can be coupled to systems for supplying, mixing and driving thermosetting resins according to claim 10, characterised in that the extrusion module comprises a catalyst dosing device and a mixer sandwiched between an inlet duct and supply conduits of the pistons.

12. The extrusion device for the processing of plastics, which can be coupled to systems for supplying, mixing and driving thermosetting resins according to claim 11, characterised in that the extrusion module comprises a pumping system to cause a flow of a resin stream which is driven towards the mixer in which it is mixed with the catalyst supplied by the catalyst dosing device, allowing activation and deactivation of the pumping system with resin in the absence of the catalyst in order to clean the entire extrusion module.

13. The extrusion device for the processing of plastics, which can be coupled to systems for supplying, mixing and driving thermosetting resins according to claim 2, characterised in that the heating-shaping module, which precedes and is coupled to the cooling-solidification module, comprises a second external heating system, the resin experiencing a second temperature increase along its path due to the heat supplied by the second external heating system.

14. The extrusion device for the processing of plastics, which can be coupled to systems for supplying, mixing and driving thermosetting resins according to claim 5, characterised in that the interchangeable hollow tube has a length that is longer than the heating-reaction module so that it can penetrate the shaping coupling and an end thereof can be located right at an inlet of the heating-shaping module.

\* \* \* \* \*